US008839929B2

(12) United States Patent
Kato et al.

(10) Patent No.: US 8,839,929 B2
(45) Date of Patent: Sep. 23, 2014

(54) HYDRAULIC CLUTCH AND TRANSMISSION DEVICE PROVIDED WITH THE SAME

(75) Inventors: Hiroshi Kato, Kariya (JP); Toshihiko Aoki, Anjo (JP); Michio Nobata, Chiryu (JP); Masaki Suzuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 214 days.

(21) Appl. No.: 13/419,013

(22) Filed: Mar. 13, 2012

(65) Prior Publication Data

US 2012/0247906 A1  Oct. 4, 2012

(30) Foreign Application Priority Data

Mar. 30, 2011 (JP) ................................. 2011-074509

(51) Int. Cl.
  *F16D 25/12* (2006.01)
(52) U.S. Cl.
  USPC .................. 192/48.619; 192/70.19; 192/85.25
(58) Field of Classification Search
  USPC .................. 192/48.618, 48.619, 70.11, 70.12, 192/85.25
  See application file for complete search history.

(56) References Cited

U.S. PATENT DOCUMENTS

| | | | |
|---|---|---|---|
| 5,421,439 A | 6/1995 | Hayasaki | |
| 7,862,461 B2 | 1/2011 | Nishida et al. | |
| 8,033,941 B2 * | 10/2011 | Nishida et al. | 192/113.5 |
| 8,083,627 B2 * | 12/2011 | Kito et al. | 192/85.25 |
| 2009/0011892 A1 | 1/2009 | Nishida et al. | |

FOREIGN PATENT DOCUMENTS

| | | |
|---|---|---|
| JP | 05-0321947 | 12/1993 |
| JP | A-06-265019 | 9/1994 |
| JP | A-2001-041261 | 2/2001 |
| JP | A-2001-050301 | 2/2001 |
| JP | A-2001-304293 | 10/2001 |
| JP | A-2009-030656 | 2/2009 |

OTHER PUBLICATIONS

Apr. 24, 2012 International Search Report issued in Patent Application No. PCT/JP2012/054698 (with translation).

* cited by examiner

*Primary Examiner* — Jacob S Scott
(74) *Attorney, Agent, or Firm* — Oliff PLC

(57) ABSTRACT

A hydraulic clutch includes a clutch drum with an outer cylinder that slidably holds a plurality of clutch plates, an inner cylinder that axially extends from an inner circumference of a sidewall, and a sleeve fitted inside the inner cylinder. A clutch piston presses the clutch plates. A plate and the clutch piston define an oil chamber that cancels centrifugal hydraulic pressure. An oil passage that communicates with the oil chamber is on an inner circumferential surface of the inner cylinder. One surface of the sleeve contacts a step formed on the inner cylinder. The sleeve includes a passage in communication with the oil passage and formed on an outer periphery of the sleeve to axially extend toward the end surface, and a second passage formed more axially recessed than an end surface and radially extending to provide communication between the first passage and an inner portion of the sleeve.

2 Claims, 7 Drawing Sheets

F I G . 2
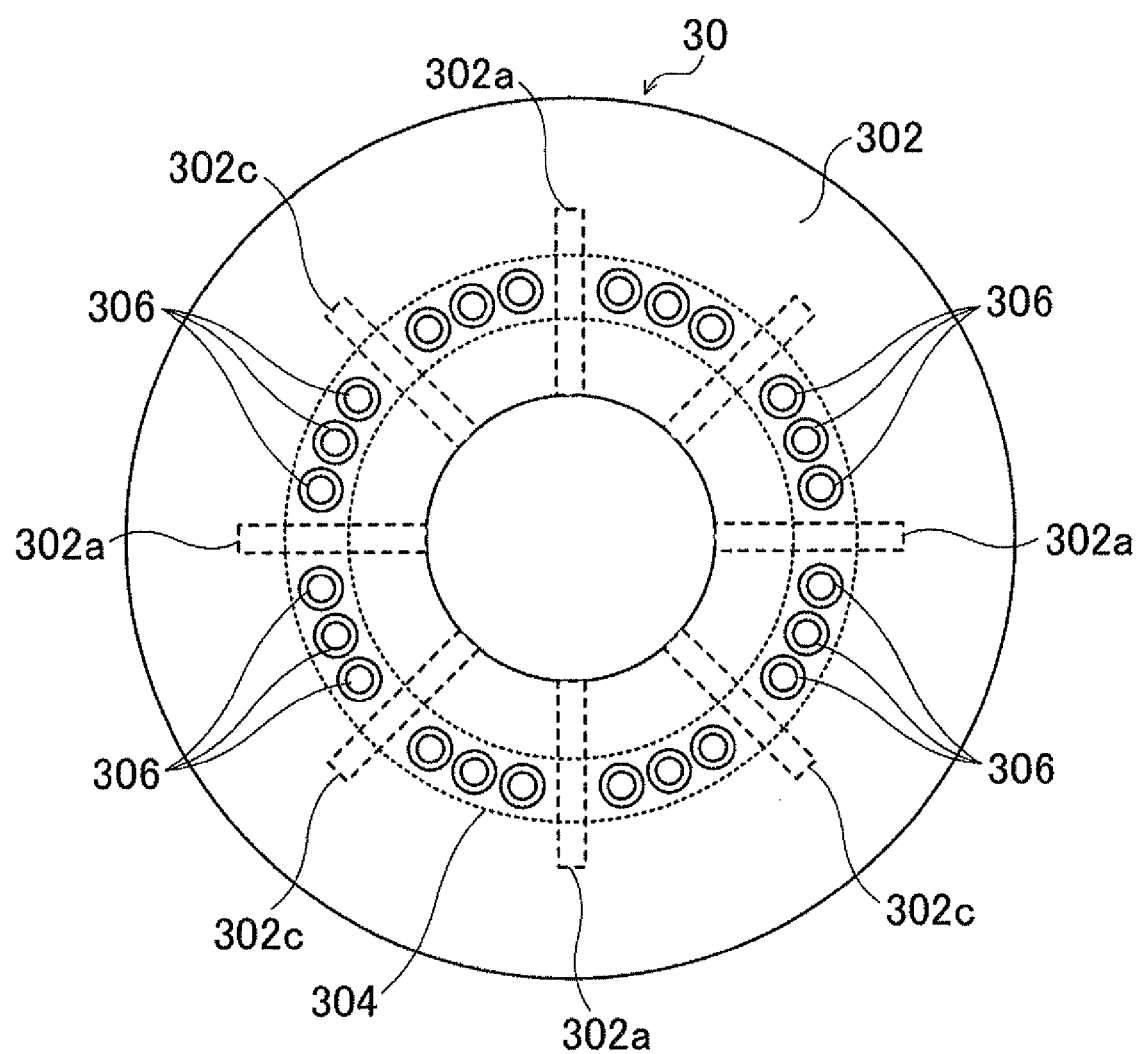

HYDRAULIC CLUTCH AND TRANSMISSION DEVICE PROVIDED WITH THE SAME

INCORPORATION BY REFERENCE

The disclosure of Japanese Patent Application No. 2011-074509 filed on Mar. 30, 2011 including the specification, drawings and abstract is incorporated herein by reference in its entirety.

BACKGROUND OF THE INVENTION

The present invention relates to a hydraulic clutch that includes a clutch drum that slidably holds a plurality of clutch plates; a sleeve that is fitted with the clutch drum; a clutch piston that can move in the axial direction by hydraulic pressure inside the clutch drum to press the clutch plates; and a cancel plate that together with the clutch piston defines a cancel oil chamber for canceling centrifugal hydraulic pressure, and also relates to a transmission device provided with the hydraulic clutch.

DESCRIPTION OF THE RELATED ART

A hydraulic clutch of this type proposed in related art (e.g., see Japanese Patent Application Publication No. 2009-30656 (JP 2009-30656 A)) includes a clutch drum; a sleeve that is fitted to an inner circumferential surface of a boss portion on a radially inner side of the clutch drum; a piston that configures a hydraulic servo using a portion of the clutch drum as a cylinder; a plurality of friction plates that engages with the clutch drum; and a cancel oil chamber that is disposed on a back surface side of the piston and cancels centrifugal hydraulic pressure that acts on the hydraulic servo. With this hydraulic clutch, oil inside the cancel oil chamber is discharged to outside the clutch drum through a discharge hole formed in the boss portion on the radially inner side of the clutch drum, and through a recessed groove formed on an outer circumferential surface of the sleeve so as to communicate with the discharge hole and opens to an end surface. By thus discharging the oil inside the cancel oil chamber through the recessed groove formed on the outer circumferential surface of the sleeve to outside the clutch drum, the zero-origin of the centrifugal hydraulic pressure of the cancel oil chamber corresponds to the recessed groove of the sleeve, which improves the cancellation rate.

SUMMARY OF THE INVENTION

In the above hydraulic clutch according to related art, as oil fills the cancel oil chamber, air inside the cancel oil chamber should be discharged to outside through the discharge hole formed in the clutch drum, and through the recessed groove formed on the sleeve. At such time, in order to fill the cancel oil chamber with oil as quickly as possible, the outflow of oil from the cancel oil chamber must be suppressed as much as possible while promoting the discharge of air from the cancel oil chamber. However, the hydraulic clutch described in JP 2009-30656 A gives no consideration to suppressing the outflow of oil while promoting the discharge of air when filling the cancel oil chamber with oil. In addition, although in the hydraulic clutch of the related art above the zero-origin of the centrifugal hydraulic pressure in the cancel oil chamber corresponds to a bottom surface of the recessed groove of the sleeve, in terms of securing centrifugal hydraulic pressure in the cancel oil chamber, the zero-origin of the centrifugal hydraulic pressure is preferably as circumferentially inward as possible.

Hence, the present invention suppresses an outflow of oil while promoting a discharge of air when filling a cancel oil chamber of a hydraulic clutch with oil, and more suitably secures centrifugal hydraulic pressure in the cancel oil chamber.

The hydraulic clutch and transmission device provided with the same of the present invention employ the following to achieve the above.

A hydraulic clutch according to the present invention includes: a clutch drum that includes an outer cylinder portion that slidably holds a plurality of clutch plates, a side wall portion that extends radially inward from the outer cylinder portion, and an inner cylinder portion that axially extends from an inner circumferential side of the side wall portion; a sleeve fitted inside the inner cylinder portion of the clutch drum; a clutch piston that can move in the axial direction by hydraulic pressure inside the clutch drum and press the clutch plates; and a cancel plate that together with the clutch piston defines a cancel oil chamber for canceling centrifugal hydraulic pressure. In the hydraulic clutch, an oil passage that is in communication with the cancel oil chamber is formed on an inner circumferential surface of the inner cylinder portion of the clutch drum, one end surface of the sleeve contacts a stepped portion formed on the inner cylinder portion of the clutch drum, and the sleeve includes a first passage that is in communication with the oil passage of the inner cylinder portion of the clutch drum and formed on an outer periphery of the sleeve so as to axially extend toward the end surface, and a second passage formed more axially recessed than the end surface and radially extending to provide communication between the first passage and an inner portion of the sleeve.

In the hydraulic clutch according to the present invention, the oil passage that is in communication with the cancel oil chamber is formed on the inner circumferential surface of the inner cylinder portion of the clutch drum. Also, the one end surface of the sleeve fitted inside the inner cylinder portion of the clutch drum contacts the stepped portion formed on the inner cylinder portion. The sleeve includes the first passage that is in communication with the oil passage of the inner cylinder portion of the clutch drum and formed on the outer periphery of the sleeve so as to axially extend toward the end surface; and the second passage formed more axially recessed than the end surface and radially extending to provide communication between the first passage and the inner portion of the sleeve. Thus, when the cancel oil chamber is filled with oil, the oil having a high specific gravity moves by centrifugal force circumferentially outward inside the cancel oil chamber, which causes air inside the cancel oil chamber to move circumferentially inward and be discharged to outside through the first and second passages. In the hydraulic clutch, the first passage extends in the axial direction of the sleeve and the second passage extends in the radial direction of the sleeve. Therefore, the air inside the cancel oil chamber can be quickly discharged to outside while also suppressing the outflow of oil through the second passage. Also, in the hydraulic clutch, the second passage that provides communication between the first passage and the inner portion of the sleeve extends from the outer circumferential surface to the inner circumferential surface of the sleeve. Therefore, the zero-origin of the centrifugal hydraulic pressure in the cancel oil chamber can correspond to the inner circumferential surface of the sleeve. As a consequence, in the hydraulic clutch, it is possible to suppress an outflow of oil while promoting a discharge of air when filling the cancel oil chamber with oil, and more suitably secure centrifugal hydraulic pressure in the cancel oil chamber.

A transmission device according to the present invention includes: the hydraulic clutch described above; and a second hydraulic clutch that is disposed circumferentially inward of the hydraulic clutch so as to overlap with the hydraulic clutch, and includes a second cancel oil chamber that is in communication with the oil passage of the inner cylinder portion of the clutch drum. In the transmission device, because the first and second passages are also in communication with the second cancel oil chamber of the second hydraulic clutch, it is possible to suppress the outflow of oil while promoting the discharge of air when filling the second cancel oil chamber of the second hydraulic clutch with oil, and more suitably secure centrifugal hydraulic pressure in the second cancel oil chamber.

A lubrication target that configures the transmission device may be disposed near the end surface of the sleeve. Thus, oil discharged from at least one of the cancel oil chamber and the second cancel oil chamber through the first and second passages can be guided to the lubrication target and contribute to lubricating the lubrication target.

BRIEF DESCRIPTION OF THE DRAWINGS

FIG. 2 is a frontal view of a clutch drum 30 as seen from the right side in FIG. 1;

DETAILED DESCRIPTION OF THE EMBODIMENT

Next, an embodiment of the present invention will be described.

Figure 1:
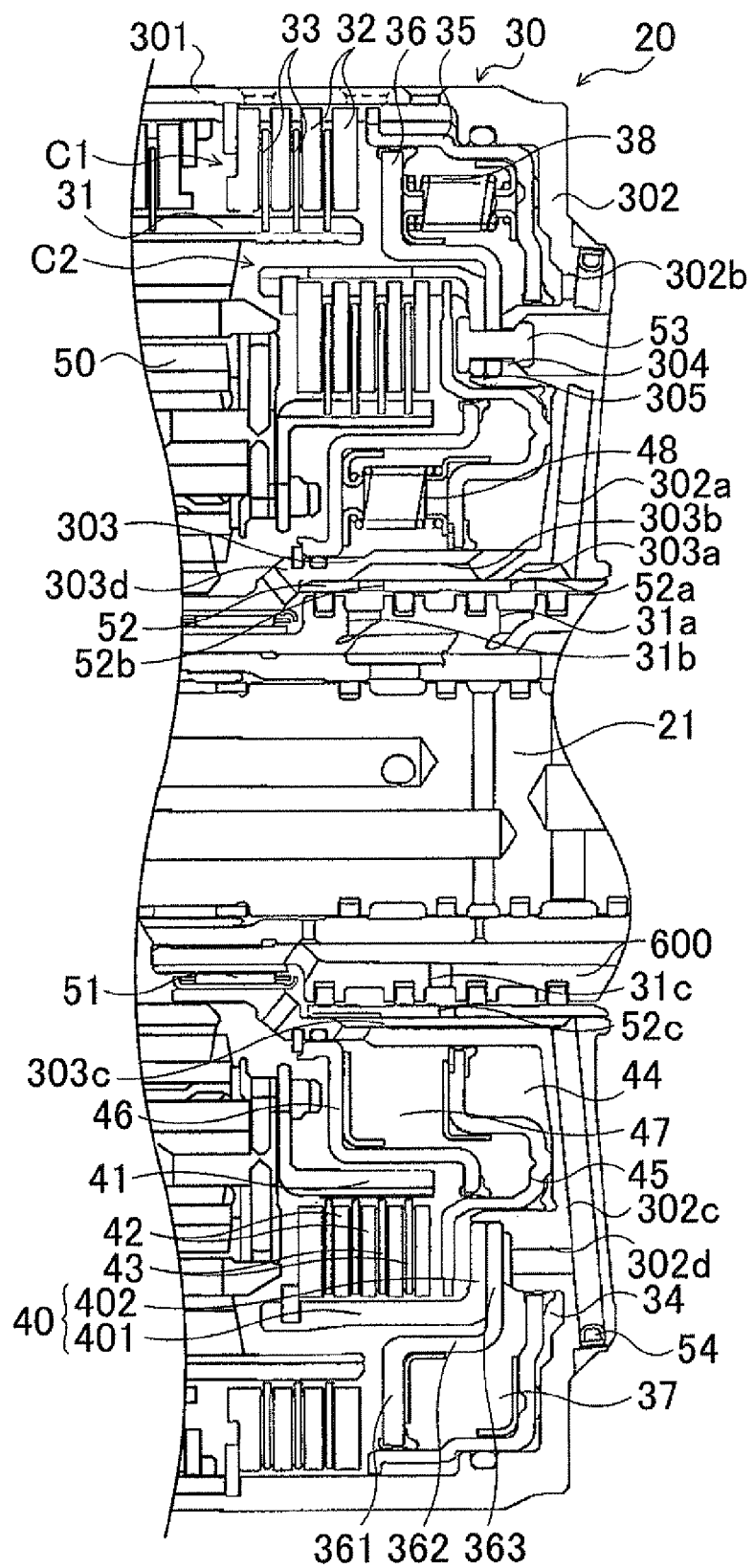
FIG. 1 is a sectional view that shows an essential portion of an automatic transmission 20 provided with clutches C1 and C2 according to an embodiment of the present invention.

FIG. 1 is an enlarged sectional view that shows an essential portion of an automatic transmission 20 provided with clutches C1 and C2 according to an embodiment of the present invention. The automatic transmission 20 according to the embodiment is configured as a stepped transmission and is mounted in a vehicle. As shown in FIG. 1, the automatic transmission 20 includes an input shaft 21, as well as the clutches C1 and C2, a plurality of other clutches and brakes (not shown), and a planetary gear mechanism 50 for changing a power transmission path from the input shaft 21 to an output shaft (not shown). The clutches C1 and C2, the plurality of other clutches and brakes, and the planetary gear mechanism 50 are accommodated inside a transmission case (not shown). Note that the input shaft 21 of the automatic transmission 20 is connected to a crankshaft of an engine through a torque converter or the like, and the output shaft is connected to a drive wheel through a differential mechanism (differential gear) or the like (none of which are shown in the drawings).

The clutch C1 is configured as a multi-plate friction hydraulic clutch. The clutch C1 includes a clutch drum 30 that is supported rotatable around the input shaft 21 through a bearing 51; a clutch hub 31 that is fixed to a ring gear, for example, of the planetary gear mechanism 50; a plurality of ring-shaped clutch plates 32 that is slidably supported on an inner circumferential surface of the clutch drum 30 through a spline; a plurality of ring-shaped clutch plates 33 that is slidably supported on an outer circumferential surface of the clutch hub 31 through a spline; a clutch piston 35 that is fitted axially slidable on the inner circumferential surface of the clutch drum 30 and movable toward the clutch plates 32, 33, and defines together with the clutch drum 30 a first engagement side oil chamber 34; a cancel plate 36 that defines together with the clutch piston 35 a first cancel oil chamber 37 for canceling centrifugal hydraulic pressure generated inside the first engagement side oil chamber 34; and a return spring 38 that is disposed between the clutch piston 35 and the cancel plate 36. The clutch drum 30 is configured from a first outer cylinder portion 301 that supports the clutch plates 32, a first side wall portion 302 that extends radially inward from an end of the first outer cylinder portion 301, and an inner cylinder portion 303 that axially extends from an inner circumferential portion of the first side wall portion 302. The inner cylinder portion 303 of the clutch drum 30 is press-fit (fitted) with a sleeve 52 so as to enable the sleeve 52 to rotate together with the inner cylinder portion 303. The sleeve 52 is rotatably supported by a fixed member (fixed shaft) 600 that is integrated with the transmission case, for example, and rotatably supports the input shaft 21. Thus, the clutch drum 30 is rotatable around the axis of the input shaft 21. One end surface (on the left side of the figure) of the sleeve 52 contacts an inner surface of a stepped portion 303d formed on the inner cylinder portion 303, whereby the sleeve 52 is positioned in the axial direction.

The clutch C2 is configured as a multi-plate friction hydraulic clutch, and disposed inward of the clutch C1 so as to overlap with the clutch C1 as viewed from the axial direction. The clutch C2 includes a clutch drum 40 that contacts (axially supports) a radially-extending inner circumferential portion of the cancel plate 36 biased by the return spring 38 toward the left side of the figure, and fastened to the clutch drum 30 together with the cancel plate 36; a clutch hub 41 that is fixed to a carrier, for example, of the planetary gear mechanism 50; a plurality of ring-shaped clutch plates 42 that is slidably supported on an inner circumferential surface of the clutch drum 40 through a spline; a plurality of ring-shaped clutch plates 43 that is slidably supported on an outer circumferential surface of the clutch hub 41 through a spline; a clutch piston 45 that is fitted axially slidable on the inner circumferential surface of the clutch drum 40 and movable toward the clutch plates 42, 43, and defines together with the clutch drum 30 a second engagement side oil chamber 44; a cancel plate 46 that defines together with the clutch piston 45 a second cancel oil chamber 47 for canceling centrifugal hydraulic pressure generated inside the second engagement side oil chamber 44; and a return spring 48 that is disposed between the clutch piston 45 and the cancel plate 46. The clutch drum 40 is configured from a second outer cylinder portion 401 that supports the clutch plates 42, and a second side wall portion 402 that extends radially inward from an end of the second outer cylinder portion 401.

A ring-shaped fixing portion 304 extends axially inward from a substantially radial center portion of the first side wall portion 302 of the clutch drum 30 of the clutch C1. A ring-shaped aligning portion 305 also extends axially inward from an end portion on the inner circumferential side of the fixing portion 304. The cancel plate 36 of the clutch C1 includes an outer circumferential portion 361 that slidingly contacts an inner circumferential portion of the clutch piston 35 through a seal member; a coupling portion 362 that axially extends from the outer circumferential portion 361; and an inner circumferential portion 363 that extends radially inward from the coupling portion 362. One end surface of the inner circumferential portion 363 contacts a radially inward end surface of the fixing portion 304 of the clutch drum 30 and the other end surface of the inner circumferential portion 363 contacts the second side wall portion 402 of the clutch drum 40 of the clutch C2. In this state, the cancel plate 36 is fitted to an outer circumferential surface of the aligning portion 305, which extends from the fixing portion 304, together with the second side wall portion 402 of the clutch drum 40.

Figure 3:
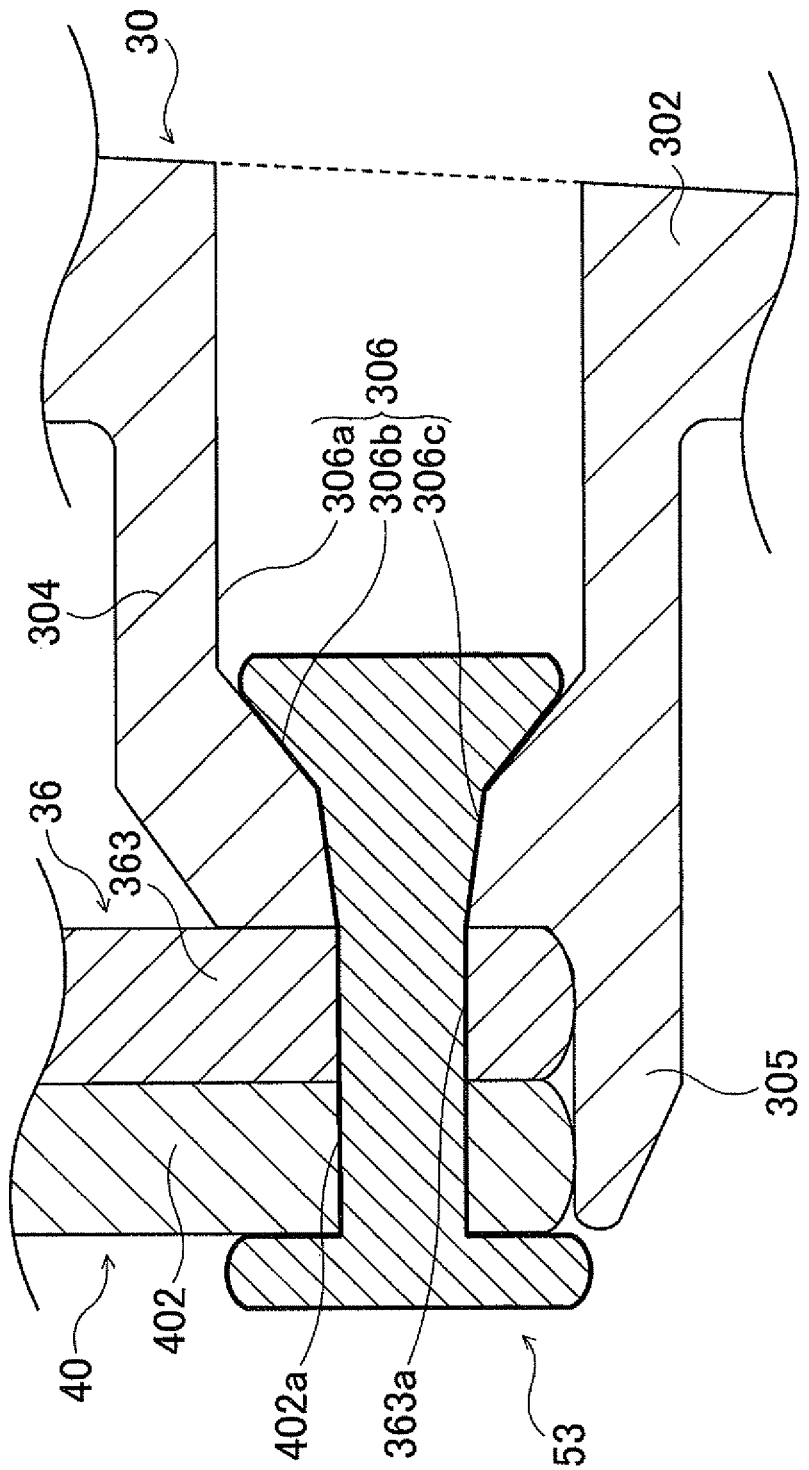
FIG. 3 is an enlarged sectional view that shows a fixing portion 304 of the clutch drum 30 and a surrounding area.

FIG. 2 is a frontal view of the clutch drum 30 as seen from the right side in FIG. 1. FIG. 3 is an enlarged sectional view that shows an essential portion of the fixing portion 304. As shown in the figures, the fixing portion 304 of the clutch drum 30 is formed with a plurality of rivet holes 306 that extends axially inward from an end surface of the first side wall portion 302 of the clutch drum 30. Each of the plurality of rivet holes 306 is formed of a first hole portion 306a that extends axially inward from the end surface of the first side wall portion 302, a second hole portion 306b that extends axially inward from the first hole portion 306a such that an inner diameter of the second hole portion 306b gradually decreases, and a third hole portion 306c that extends further axially inward from the second hole portion 306b such that an inner diameter of the third hole portion 306c gradually decreases. The cancel plate 36 of the clutch C1 is also formed with a plurality of rivet holes 363a, each of which is in communication with the third hole portion 306c of the rivet hole 306 of the fixing portion 304 when the inner circumferential portion 363 of the cancel plate 36 is fitted to the aligning portion 305. In addition, the second side wall portion 402 of the clutch drum 40 of the clutch C2 is formed with a plurality of rivet holes 402a, each of which is in communication with the rivet hole 363a of the cancel plate 36 when the inner circumferential portion of the second side wall portion 402 is fitted to the aligning portion 305. A rivet 53 is inserted in the rivet holes 306, 363a, and 402a. The rivet 53 is caulked from axially outward of the clutch drum 30 to fasten together the cancel plate 36 and the second side wall portion 402 of the clutch drum 40 to the fixing portion 304 of the clutch drum 30. Thus, the clutch drum 30, the cancel plate 36, and the clutch drum 40 can be easily fastened together, and the cancel plate 36 is axially supported by the second side wall portion 402 of the clutch drum 40 that contacts the inner circumferential portion 363. Note that the clutch drum 30, the cancel plate 36, and the clutch drum 40 may be fastened together by a bolt and a nut.

The clutch piston 35 of the clutch C1 is supported axially slidable by the fixing portion 304 of the clutch drum 30 through a seal member, and slidingly contacts an inner circumferential surface of the first outer cylindrical portion 301 of the clutch drum 30 through a seal member. The clutch piston 35 thus defines, together with the first outer cylinder portion 301, the first side wall portion 302, and the fixing portion 304 of the clutch drum 30, the first engagement side oil chamber 34. The clutch piston 45 of the clutch C2 is supported axially slidable by the inner cylinder portion 303 of the clutch drum 30 through a seal member, and slidingly contacts an inner circumferential surface of the fixing portion 304 of the clutch drum 30 through a seal member. The clutch piston 45 thus defines, together with the inner cylinder portion 303, the first side wall portion 302, and the fixing portion 304 of the clutch drum 30, the second engagement side oil chamber 44. By utilizing the fixing portion 304 formed on the first side wall portion 302 of the clutch drum 30 in this manner, the first and second clutches can be easily configured.

The fixed member 600 is formed with supply passages 31a, 31b that are connected to a hydraulic control device (not shown) through an oil passage (not shown) formed in the input shaft 21. The fixed member 600 is also formed with a supply passage 31c to which drained hydraulic oil is supplied from a hydraulic circuit of a lubrication system (not shown) that supplies lubricating oil to a lubrication target such as the planetary gear mechanism 50 mounted in the automatic transmission 20. In addition, the sleeve 52 press-fit to the clutch drum 30 of the clutch C1 is formed with an oil hole 52a that is in communication with the supply passage 31a formed in the fixed member 600, and an oil hole 52b that is in communication with the supply passage 31b. The inner cylinder portion 303 of the clutch drum 30 is formed with a relay oil passage 303a that is in communication with the oil hole 52a of the sleeve 52, and a relay oil passage 303b that is in communication with the oil hole 52b. The relay oil passage 303b is in communication with the second engagement side oil chamber 44. As shown in FIGS. 1 and 2, the first side wall portion 302 of the clutch drum 30 is formed with a plurality (four in the embodiment) of first oil passages 302a that radially extend in a radiating manner. Each of the plurality of first oil passages 302a on the inner circumferential side thereof is in communication with the relay oil passage 303a formed in the inner cylinder portion 303, and also in communication with the first engagement side oil chamber 34 through an oil passage 302b that is more circumferentially outward than the fixing portion 304 and axially extends through an inner portion of the first side wall portion 302. Thus, the hydraulic control device and the first engagement side oil chamber 34 are connected through the supply passage 31a of the fixed member 600, the relay oil passage 303a of the inner cylinder portion 303 of the clutch drum 30, and the first oil passage 302a and the oil passage 302b of the first side wall portion 302. Also, the hydraulic control device and the second engagement side oil chamber 44 are connected through the supply passage 31b of the fixed member 600, and the relay oil passage 303b of the inner cylinder portion 303 of clutch drum 30.

In addition, the sleeve 52 press-fit to the clutch drum 30 of the clutch C1 is formed with an oil hole 52c that is in communication with a supply passage 31c formed in the fixed member 600. The inner cylinder portion 303 of the clutch drum 30 is formed with a relay oil passage 303c that is in communication with the oil hole 52c of the sleeve 52. The relay oil passage 303c is formed so as to axially extend on an inner circumferential surface of the inner cylinder portion 303 of the clutch drum 30, and an end (an end portion on the left side of FIG. 1) of the relay oil passage 303c radially extends and is in communication with the second cancel oil chamber 47 of the clutch C2. As shown in FIGS. 1 and 2, the first side wall portion 302 of the clutch drum 30 is formed with a plurality (four in the embodiment) of second oil passages 302c that radially extend in a radiating manner that alternates with the plurality of first oil passages 302a so as not to overlap with the plurality of first oil passages 302a as viewed from the axial direction. Each of the plurality of second oil passages 302c on the inner circumferential side thereof is in communication with the relay oil passage 303c formed in the inner cylinder portion 303, and also in communication with the first cancel oil chamber 37 through an oil passage 302d that axially extends through an inner portion of the fixing portion 304.

Figure 4:
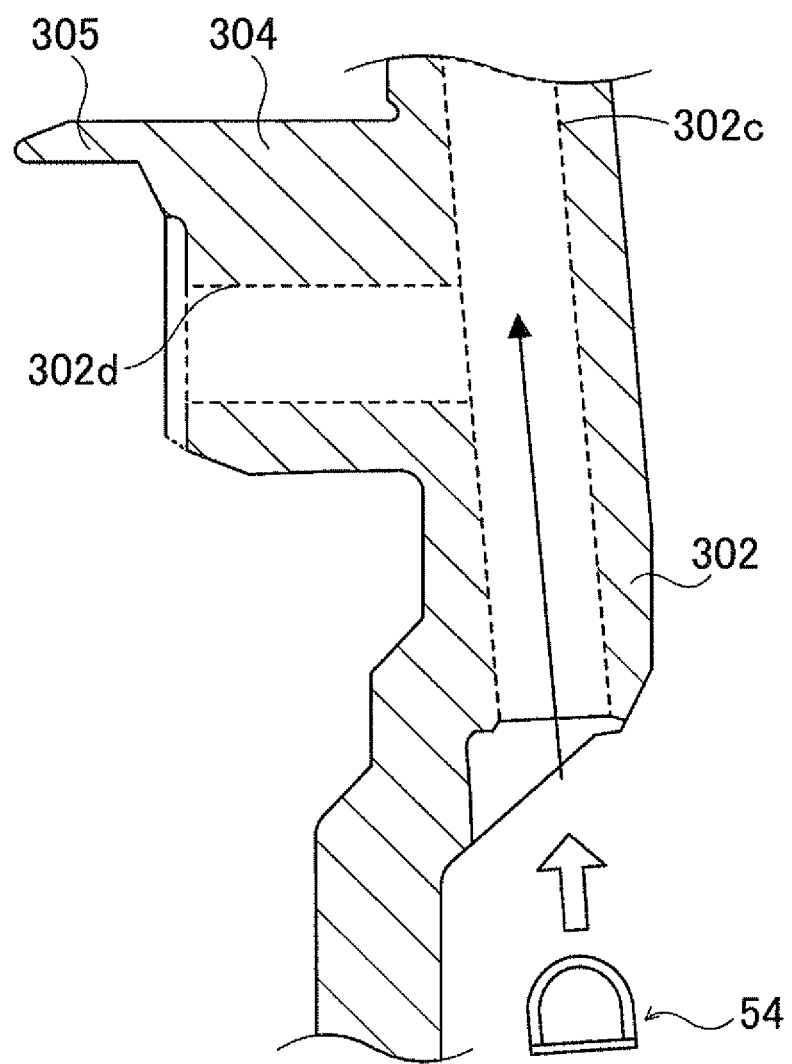
FIG. 4 is an enlarged sectional view that shows a second oil passage 302c formed in a first side wall portion 302 of the clutch drum 30 and a surrounding area.

Thus, a draining oil passage of the hydraulic circuit of the lubrication system and the first cancel oil chamber 37 are connected through the supply passage 31c of the fixed member 600, the relay oil passage 303c of the inner cylinder portion 303 of the clutch drum 30, the second oil passage 302c of the first side wall portion 302, and the oil passage 302d. Also, the draining oil passage of the hydraulic circuit and the second cancel oil chamber 47 are connected through the supply passage 31c of the fixed member 600, and the relay oil passage 303c of the inner cylinder portion 303 of clutch drum 30. By forming the first oil passages 302a and the second oil passages 302c on substantially the same plane inside the first side wall portion 302 in this manner, an increase in the axial length of the clutches C1, C2 can be suppressed. In addition, by alternately forming the first oil passages 302a and the second oil passages 302c as viewed from the axial direction, hydraulic oil can be equally supplied to the first engagement side oil chamber 34 and the first cancel oil chamber 37 formed into ring shapes. Here, as shown by an arrow in FIG. 4, the first and second oil passages 302a, 302c described above can be easily formed by forming a hole portion penetrating radially inward from an outer periphery of the first side wall portion 302 of the clutch drum 30, and then press-fitting a plug (lid element) 54 to an opening portion of the hole portion positioned on the outer circumferential side of the first side wall portion 302 as shown by a white arrow in FIG. 4 to close the opening portion.

Figure 5:
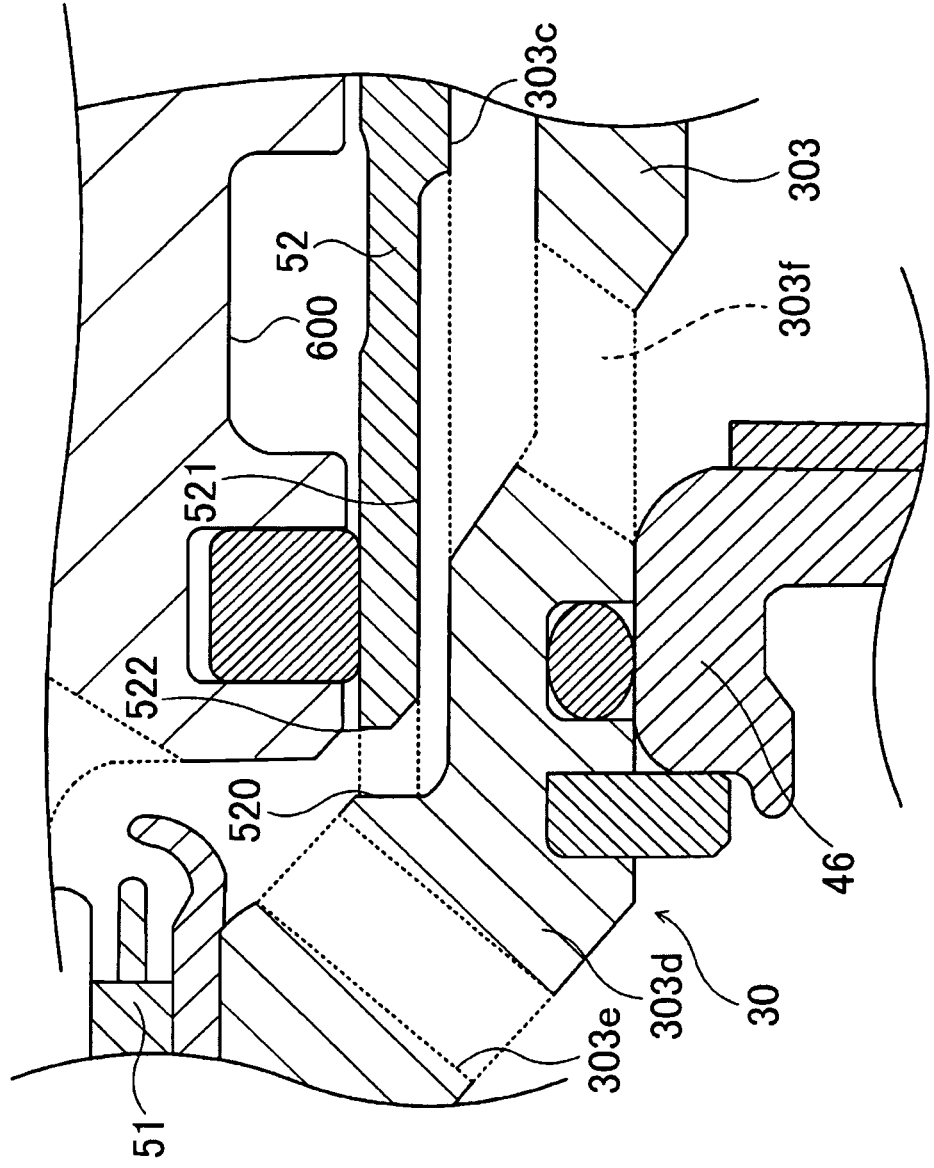
FIG. 5 is an enlarged sectional view that shows a portion of contact between a sleeve 52 and a stepped portion 303d of an inner cylinder portion 303 of the clutch drum 30.
Figure 6:
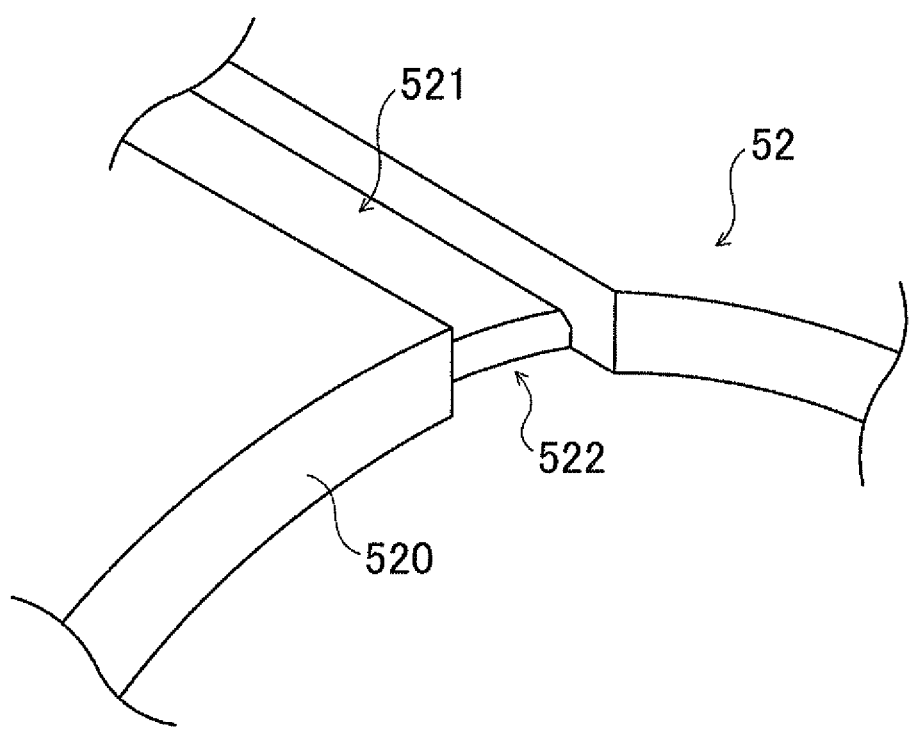
FIG. 6 is an enlarged view of an essential portion that shows an end portion of the sleeve 52.

FIG. 5 is an enlarged sectional view that shows a portion of contact between the sleeve 52 and the stepped portion 303d of the inner cylinder portion 303 of the clutch drum 30. FIG. 6 is an enlarged view of an essential portion that shows an end portion of the sleeve 52. As shown in the figures, at the end portion of the sleeve 52, a first passage 521 is formed at a plurality of locations (four locations in the embodiment) on an outer periphery of the sleeve 52. Each first passage 521 is in communication with the relay oil passage 303c formed in the inner circumferential surface of the inner cylinder portion 303 of the clutch drum 30, and axially extends toward an end surface 520 that contacts the stepped portion 303d of the inner cylinder portion 303. In addition, at the end portion of the sleeve 52, a second passage 522 is farmed at a plurality of locations (four locations in the embodiment). Each second passage 522 is formed more axially recessed than the end surface 520 that contacts the stepped portion 303d of the inner cylinder portion 303, and radially extending to provide communication between the first passage 521 and an inner portion of the sleeve 52. The second passage 522 is formed so as to open widest at a position that is in communication with the first passage 521, and gradually narrow in the axial direction in the vicinity of a radial center portion of the sleeve 52 from the position at which the second passage 522 is in communication with the first passage 521, after which the second passage 522 has the same cross-sectional shape up to the inner circumferential surface of the sleeve 52. The stepped portion 303d of the inner cylinder portion 303 is formed with an oil passage 303e as shown in the figure.

Next, the operation to supply hydraulic oil to the oil chambers of the clutches C1, C2 of the automatic transmission 20 thus configured will be described. When engaging the clutch C1 of the embodiment, hydraulic oil from the hydraulic control device is supplied to the first engagement side oil chamber 34 through the supply passage 31a of the fixed member 600, the relay oil passage 303a of the inner cylinder portion 303 of the clutch drum 30, and the first oil passage 302a and the oil passage 302b of the first side wall portion 302. Thus, hydraulic pressure acting on the first engagement side oil chamber 34 causes the clutch piston 35 to move toward the clutch plates 32, 33 such that the clutch plates 32, 33 are sandwiched between the clutch piston 35 and a contact member fixed to the clutch drum 30, thus coupling the clutch drum 30 and the clutch hub 31 by the friction force acting between the clutch plates 32, 33. When disengaging the clutch C1, the hydraulic control device (not shown) stops the supply of hydraulic pressure to the first engagement side oil chamber 34, and the clutch piston 35 is biased by the return spring 38 to move toward the reverse side of the clutch plates 32, 33, thus disengaging the coupling of the clutch drum 30 and the clutch hub 31. When engaging the clutch C2, hydraulic oil from the hydraulic control device is supplied to the second engagement side oil chamber 44 through the supply passage 31b of the fixed member 600, and the relay oil passage 303b of the inner cylinder portion 303 of the clutch drum 30. Thus, hydraulic pressure acting on the second engagement side oil chamber 44 causes the clutch piston 45 to move toward the clutch plates 42, 43 such that the clutch plates 42, 43 are sandwiched between the clutch piston 45 and a contact member fixed to the clutch drum 40, thus coupling the clutch drum 40 and the clutch hub 41 by the friction force acting between the clutch plates 42, 43, When disengaging the clutch C2, the hydraulic control device (not shown) stops the supply of hydraulic pressure to the second engagement side oil chamber 44, and the clutch piston 45 is biased by the return spring 48 to move toward the reverse side of the clutch plates 42, 43, thus disengaging the coupling of the clutch drum 40 and the clutch hub 41.

If the automatic transmission 20 is operated with the first and second engagement side oil chambers 34, 44 filled with hydraulic oil as described above, centrifugal hydraulic pressure is generated in the first and second engagement side oil chambers 34, 44. Therefore, even if the supply of hydraulic pressure to the first and second engagement side oil chambers 34, 44 is stopped in order to disengage the clutches C1 and C2, the clutch pistons 35, 45 may remain pressed axially inward (toward the left side in FIG. 1) by the centrifugal hydraulic pressure, thus delaying disengagement of the clutches C1, C2. Therefore, when the automatic transmission 20 operates with the first and second engagement side oil chambers 34, 44 filled with hydraulic oil, the drained hydraulic oil from the hydraulic circuit of the lubrication system is supplied to the first cancel oil chamber 37 of the clutch C1 through the supply passage 31c of the fixed member 600, the relay oil passage 303c of the inner cylinder portion 303 of the clutch drum 30, and the second oil passage 302c of the first side wall portion 302, and the oil passage 302d. Also, the drained hydraulic oil from the hydraulic circuit of the lubrication system is supplied to the second cancel oil chamber 47 of the clutch C2 through the supply passage 31c of the fixed member 600, and the relay oil passage 303c of the inner cylinder portion 303 of clutch drum 30. As a consequence, centrifugal hydraulic pressure is also generated in the first and second cancel oil chambers 37, 47, and the centrifugal hydraulic pressure presses the clutch pistons 35, 45 axially outward (toward the right side in FIG. 1) so that a force caused by the centrifugal hydraulic pressure generated in the first and second engagement side oil chambers 34, 44 and acting on the clutch pistons 35, 45 can be canceled out.

In this case, immediately after the vehicle starts operating, the first and second cancel oil chambers 37, 47 are not fully filled with hydraulic oil and there is still air inside the first and second cancel oil chambers 37, 47. The air still inside the first cancel oil chamber 37 is discharged to outside the clutch C1 through the oil passage 302d, the second oil passage 302c of the first side wall portion 302, the relay oil passage 303c of the inner cylinder portion 303 of the clutch drum 30, and the first and second passages 521, 522 formed in the sleeve 52 when hydraulic oil is supplied to inside the first cancel oil chamber 37. The air still inside the second cancel oil chamber 47 is discharged to outside the clutch C2 through a communication passage 303f formed on the inner cylinder portion 303 of the clutch drum 30, the relay oil passage 303c of the inner cylinder portion 303 of the clutch drum 30, and the first and second passages 521, 522 formed in the sleeve 52. At such time, hydraulic oil having a high specific gravity moves by centrifugal force circumferentially outward inside the first and second cancel oil chambers 37, 47, which causes air inside the first and second cancel oil chambers 37, 47 to move circumferentially inward. Therefore, by using the second passage 522 that extends radially inward along the end surface 520 of the sleeve 52 as part of a path for discharging air, the air inside the first and second cancel oil chambers 37, 47 can be quickly discharged to outside while also suppressing an outflow of hydraulic oil through the second passage 522. In addition, the second passage 522 that provides communication between the first passage 521 and the inner portion of the sleeve 52 extends from the outer circumferential surface to the inner circumferential surface of the sleeve 52. Therefore, the zero-origin of the centrifugal hydraulic pressure in the first and second cancel oil chambers 37, 47 can correspond to the inner circumferential surface of the sleeve 52. As a consequence, it is possible to suppress the outflow of hydraulic oil while promoting the discharge of air when filling the first and second cancel oil chambers 37, 47 with hydraulic oil, and more suitably secure centrifugal hydraulic pressure in the first and second cancel oil chambers 37, 47. Note that the air discharged to outside the clutches C1, C2 through the first and second passages 521, 522 of the sleeve 52 is discharged through an inner portion of the transmission case to outside the vehicle. Once the hydraulic oil inside the first and second cancel oil chambers 37, 47 is discharged through the first and second passages 521, 522 of the sleeve 52, the hydraulic oil flows back to an oil pan (not shown) after being supplied to the lubrication target, i.e., the planetary gear mechanism 50, through the oil passage 303e formed in the stepped portion 303d of the inner cylinder portion 303 of the clutch drum 30, and a gap of the bearing 51.

Thus, when the automatic transmission 20 is operated with the first cancel oil chamber 37 filled with hydraulic oil and centrifugal hydraulic pressure is generated in the first cancel oil chamber 37, the centrifugal hydraulic pressure causes the inner circumferential portion 363 of the cancel plate 36 to press the second side wall portion 402 of the clutch drum 40 of the clutch C2 in the axial direction. Here, as described above, the inner circumferential portion 363 of the cancel plate 36 and the second side wall portion 402 of the clutch drum 40 are fastened by the fixing portion 304 of the clutch drum 30. Therefore, when the cancel plate 36 presses the clutch drum 40, the fulcrum point (portion where the clutch drum 40 and the clutch drum 30 are fastened) and the force point (section where the clutch drum 40 supports the cancel plate 36, i.e., portion of contact between the inner circumferential portion 363 of the cancel plate 36 and the second side wall portion 402 of the clutch drum 40) of a torsional moment that acts on the clutch drum 40 correspond to substantially the same position. Thus, a large torsional moment acting on the clutch drum 40 can be suppressed, and deformation of the clutch drum 40 can be well suppressed.

In the clutch C1 mounted in the automatic transmission 20 according to the embodiment described above, the inner circumferential surface of the inner cylinder portion 303 of the clutch drum 30 is formed with the relay oil passage 303c that is in communication with the first cancel oil chamber 37.

Also, the one end surface 520 of the sleeve 52 fitted inside the inner cylinder portion 303 of the clutch drum 30 contacts the stepped portion 303d formed on the inner cylinder portion 303. The sleeve 52 includes the first passage 521 that is in communication with the relay oil passage 303c of the inner cylinder portion 303 of the clutch drum 30 and formed on the outer periphery of the sleeve 52 so as to axially extend toward the end surface 520; and the second passage 522 formed more axially recessed than the end surface 520 and radially extending to provide communication between the first passage 521 and the inner portion of the sleeve 52. Thus, when the first cancel oil chamber 37 is filled with hydraulic oil, the hydraulic oil having a high specific gravity moves by centrifugal force circumferentially outward inside the first cancel oil chamber 37, which causes air inside the first cancel oil chamber 37 to move circumferentially inward and be discharged to outside through the first and second passages 521, 522. In the clutch C1, the first passage 521 extends in the axial direction of the sleeve 52 and the second passage 522 extends in the radial direction of the sleeve 52. Therefore, the air inside the first cancel oil chamber 37 can be quickly discharged to outside while also suppressing the outflow of hydraulic oil through the second passage 522. Also, in the clutch C1, the second passage 522 that provides communication between the first passage 521 and the inner portion of the sleeve 52 extends from the outer circumferential surface to the inner circumferential surface of the sleeve 52. Therefore, the zero-origin of the centrifugal hydraulic pressure in the first cancel oil chamber 37 can correspond to the inner circumferential surface of the sleeve 52. As a consequence, in the clutch C1, it is possible to suppress the outflow of hydraulic oil while promoting the discharge of air when filling the first cancel oil chamber 37 with hydraulic oil, and more suitably secure centrifugal hydraulic pressure in the first cancel oil chamber 37.

The automatic transmission 20 of the embodiment includes the clutch C1; and the clutch C2 that is disposed circumferentially inward of the clutch C1 so as to overlap with the clutch C1 and includes the second cancel oil chamber 47 that is in communication with the relay oil passage 303c of the inner cylinder portion 303 of the clutch drum 30. Thus, in the automatic transmission 20, because the first and second passages 521, 522 are also in communication with the second cancel oil chamber 47 of the clutch C2, it is possible to suppress the outflow of hydraulic oil while promoting the discharge of air when filling the second cancel oil chamber 47 of the clutch C2 with hydraulic oil, and more suitably secure centrifugal hydraulic pressure in the second cancel oil chamber 47.

Moreover, the lubrication target (the planetary gear mechanism 50) that configures the automatic transmission 20 is disposed near the end surface 520 of the sleeve 52. Thus, hydraulic oil discharged from at least one of the first and second cancel oil chambers 37, 47 through the first and second passages 521, 522 can be guided to the lubrication target and contribute to lubricating the lubrication target.

Figure 7:
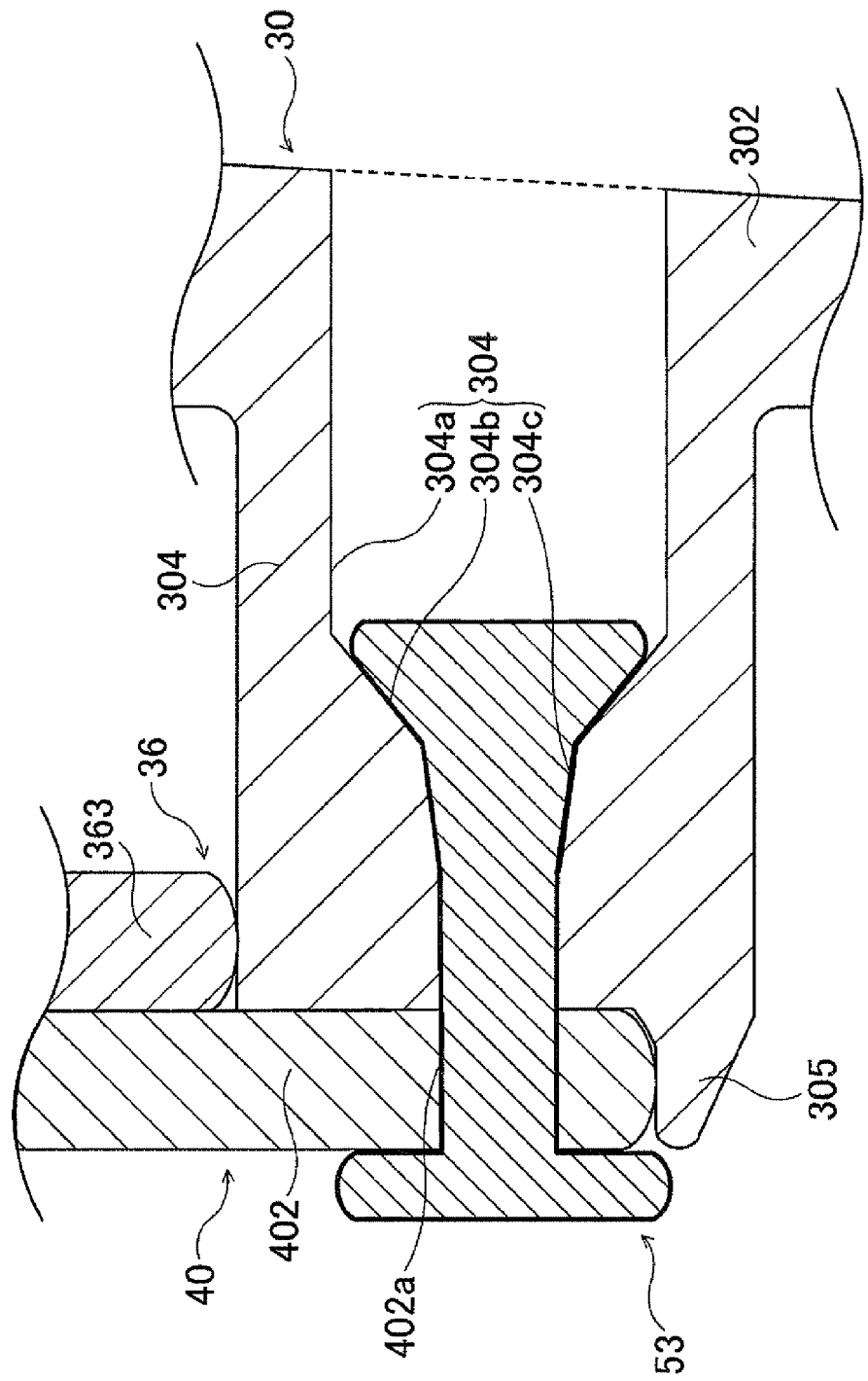
FIG. 7 is an enlarged sectional view that shows the fixing portion 304 of the clutch drum 30 and the surrounding area.

Note that, as shown in FIG. 7, the cancel plate 36 may not be fastened to the fixing portion 304, provided that an end surface of the inner circumferential portion 363 on the left side of the figure is supported by the clutch drum 40 in the vicinity of the coupled portions of the clutch drum 30 and the clutch drum 40. Further note that the hydraulic clutch of the present invention is not limited to the automatic transmission 20 of the embodiment, and may obviously be applied to a manual transmission as well.

Here, the correspondence will be explained between main elements of the embodiment and main elements of the invention as described in the Summary of the Invention. In the embodiment, the clutch drum 30 that includes the first outer cylinder portion 301 that slidably holds the plurality of clutch plates 32, 33, the first side wall portion 302 that extends radially inward from the first outer cylinder portion 301, and the inner cylinder portion 303 that axially extends from the inner circumferential side of the first side wall portion 302 corresponds to a "clutch drum"; the sleeve 52 fitted inside the inner cylinder portion 303 of the clutch drum 30 to a "sleeve"; the clutch piston 35 that can move in the axial direction by hydraulic pressure inside the clutch drum 30 and press the clutch plates 32, 33 to a "clutch piston"; the cancel plate 36 that together with the clutch piston 35 defines the first cancel oil chamber 37 for canceling centrifugal hydraulic pressure to a "cancel plate"; the clutch C1 to a "hydraulic clutch"; the relay oil passage 303c that is in communication with the first cancel oil chamber 37 formed on the inner circumferential surface of the inner cylinder portion 303 of the clutch drum 30 to an "oil passage"; the first passage 521 formed on the outer periphery of the sleeve 52 to a "first passage"; the second passage 522 to a "second passage"; the clutch C2 to a "second hydraulic clutch"; and the automatic transmission 20 to a "transmission device".

Note that with regard to the correspondence between the main elements of the embodiment and the main elements of the invention as listed in the Summary of the Invention, the embodiment is only an example for giving a specific description of a mode for carrying out the invention explained in the Summary of the Invention. This correspondence does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a mode for carrying out the present invention. However, the present invention is not particularly limited to such an example, and may obviously be carried out using various embodiments without departing from the scope of the present invention.

The present invention can be utilized in the manufacturing industry for hydraulic clutches and transmission devices provided with the same.

What is claimed is:
1. A hydraulic clutch comprising:
a clutch drum that includes an outer cylinder portion that slidably holds a plurality of clutch plates, a side wall portion that extends radially inward from the outer cylinder portion, and an inner cylinder portion that axially extends from an inner circumferential side of the side wall portion;
a sleeve fitted inside the inner cylinder portion of the clutch drum;
a clutch piston that is axially movable by hydraulic pressure inside the clutch drum and presses the clutch plates; and
a cancel plate that together with the clutch piston defines a cancel oil chamber that cancels centrifugal hydraulic pressure, wherein
the cancel plate and an outer circumferential surface of the inner cylinder portion of the clutch drum are sealed,
an oil passage that is in communication with the cancel oil chamber is formed on an inner circumferential surface of the inner cylinder portion of the clutch drum,
one end surface of the sleeve contacts a stepped portion formed on the inner cylinder portion of the clutch drum, and
the sleeve includes a first passage that is in communication with the oil passage of the inner cylinder portion of the clutch drum and formed on an outer periphery of the sleeve so as to axially extend toward the end surface, and a second passage that is axially recessed from the end surface of the sleeve, the second passage radially extending so that the second passage connects the first passage and an inner portion of the sleeve, the second passage being configured to discharge air from the cancel oil chamber.

2. A transmission device comprising:
the hydraulic clutch according to claim 1; and
a communication passage that communicates the cancel oil chamber is provided on the inner cylinder portion of the clutch drum, and
a supply passage that supplies hydraulic oil to the oil passage is provided on the sleeve,
wherein the communication passage is provided between the second passage and the supply passage in an axial direction of the hydraulic clutch.

* * * * *